Dec. 13, 1949     E. V. MATHY     2,490,975
CATALYTIC CONVERSION OF HYDROCARBONS
Filed Sept. 19, 1946
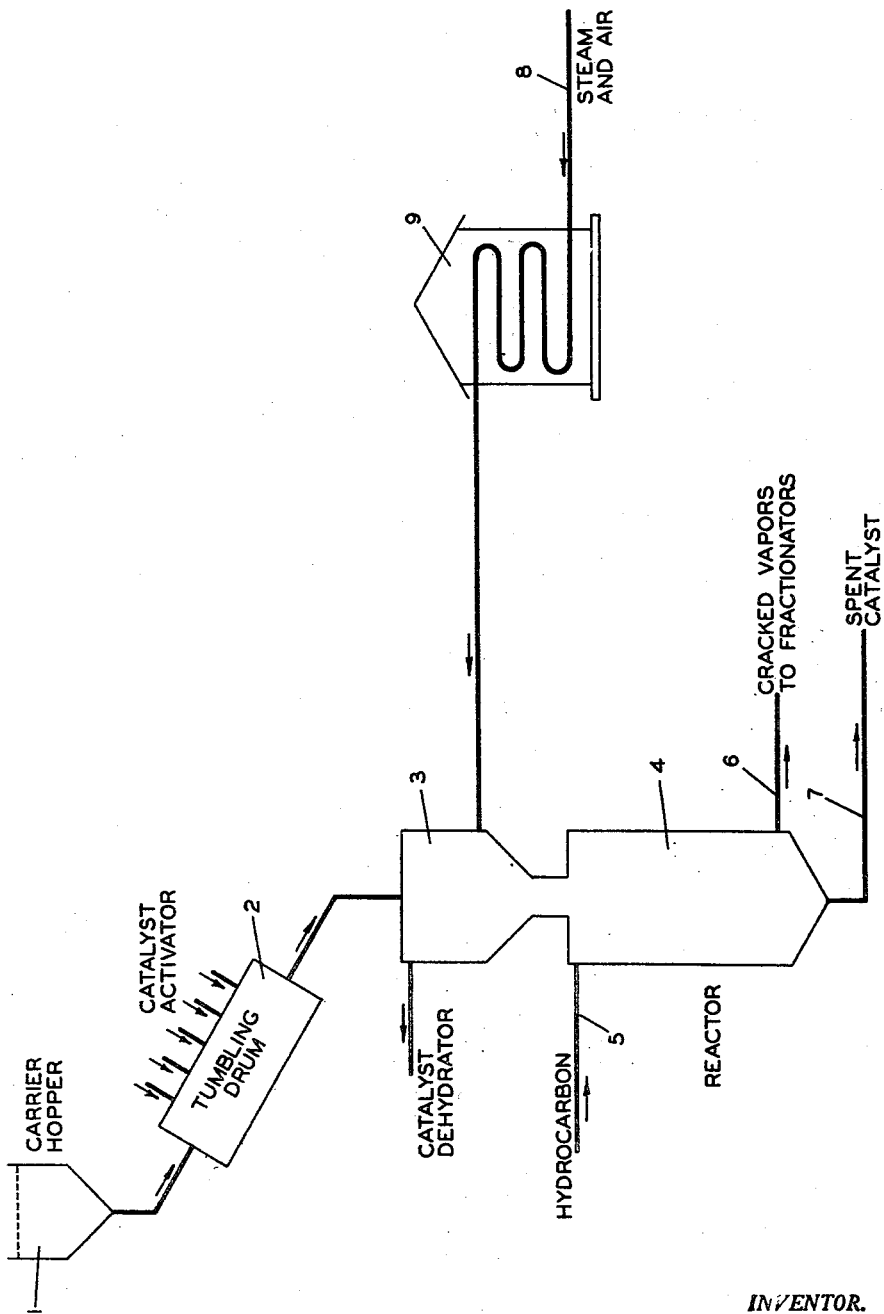
INVENTOR.
E. V. MATHY
BY
Hudson and Young
ATTORNEYS.

Patented Dec. 13, 1949

2,490,975

UNITED STATES PATENT OFFICE 2,490,975

CATALYTIC CONVERSION OF HYDROCARBONS

Eugene V. Mathy, Bartlesville, Okla., assignor to Phillips Petroleum Company, a corporation of Delaware Application September 19, 1946, Serial No. 697,963

7 Claims. (Cl. 196—52)

This invention relates to a method for the catalytic conversion of hydrocarbons. More particularly, it relates to an improved method for carrying out hydrocarbon conversions in the presence of moving catalyst beds and to an improved method of preparing catalysts for use in such processes.

In conventional hydrocarbon conversion processes using solid catalysts, the catalytic material is deactivated by deposition thereon of carbonaceous material. The catalytic material is usually of a refractory nature or is deposited on a refractory support. At the conclusion of the conversion reaction, it is necessary to remove these deposits in order to reactivate the catalyst for further use. This reactivation is usually carried out by contacting the catalyst with an oxygen-containing gas under combustion conditions of temperature in order to burn off the carbonaceous material. Usually air or air-diluent mixtures such as air-steam or air-flue gas are utilized for this purpose. Such reactivation operations involve considerable additional equipment and expense and the combustion reaction itself requires careful control in order to maintain proper temperature conditions and avoid overheating of equipment and catalyst.

In certain types of catalytic hydrocarbon conversion reactions, mobile catalysts in the form of moving beds of granular material or fluid suspensions of finely divided material are commonly utilized. In such methods the moving or flowing catalyst passes through a reaction zone either continuously or intermittently and then through a reactivation zone wherein carbonaceous deposits are removed by combustion. Such a procedure involves considerable trouble and expense due to equipment requirements in burning large masses of catalyst and conveying hot material to and from the combustion zone. Furthermore, precautions must be taken during the burning operation to avoid high temperatures which might injure the catalyst or the support and thus control methods must be applied to regulate temperatures and temperature conditions below the optimum for rapid reactivation must be utilized.

It is an object of the present invention to provide an improved method for catalytic hydrocarbon conversion. It is an additional object of the present invention to provide a novel and simplified mode of preparing and utilizing catalyst in a catalytic hydrocarbon conversion utilizing mobile catalyst. A further object of the present invention is to provide a novel manner of preparing and handling catalytic material in a moving bed type of hydrocarbon conversion. A still further object of the invention is to provide for efficient utilization of carbonaceous deposits formed during catalytic hydrocarbon conversion.

Applicant has discovered a method whereby continuous, periodic or intermittent flow of catalyst may be carried out in a catalyst zone utilizing a catalyst on a combustible support. This catalyst will permit effective conversion, and the carbonaceous material deposited thereon may then be converted to heat usable in this or other processes by combustion together with the said support. In accordance with the invention catalyst is deposited or formed on a suitable combustible carrier material. Such carriers include activated charcoal, sized metallurgical coke, sawdust, etc. Preferably, the carrier is one which is inflammable at temperatures above 700° F. Where the catalyst is to be used in a moving bed process the carrier is granulated to the desired size and the active catalytic material is impregnated therein or otherwise associated therewith. The thus-formed catalyst flows through the reaction zone under conversion conditions in contact with the hydrocarbon reactant, the spent, or partially spent catalyst being removed from the zone and passed to a combustion zone wherein the catalyst is burned to provide heat, or else the carbonized material transported or sold for fuel purposes. The catalyst may be returned to the activation treatment. In this manner continuous or a semi-continuous operation may be provided. Where conversion in fixed beds may be desired, the process may be operated batchwise by preparing catalyst in the manner described, feeding it into the conversion chamber, carrying out the reaction in fixed bed until the catalyst is substantially deactivated, and then dumping the carbonized material out of the chamber and refilling with fresh catalyst. While this is going on the hydrocarbon flow may be switched to a similar chamber so that continuous operation may be obtained by alternating chambers.

This invention is illustrated by the drawing which describes a typical system for carrying out the process. In the drawing, a combustible material, such as activated charcoal, coke or sawdust, is placed in hopper 1. The carrier material flows by gravity, or is conveyed into tumbling drum 2, in which the carrier is sprayed with a solution or suspension of catalytically active material or activating ingredient. The activating material may be alumina in suspension, or solutions or suspensions of compounds of metals in the left hand columns of groups IV, V and VI of the periodic table. These solutions may include salts of chromium, vanadium, magnesium, aluminum, tungsten, etc., and particularly those such as chromium nitrate or aluminum nitrate which will form the corresponding oxide on heating. The treated carrier then flows into dehydrating zone 3 where the activating material is dehydrated. This dehydration may be carried out in any desired manner as by flowing hot, dry air or flue-gas therethrough. One of the features of the present invention includes effecting this dehydration by controlled partial combustion of the carrier itself using air or air-diluent mixtures at combustion temperatures. In this way the carrier itself supplies fuel for the heat required during dehydration. In the dehydrating zone the catalyst is also preheated for the reaction itself, either by the dehydrating gases or by the products of combustion produced by partial combustion of the carrier. The catalyst may in this manner be desirably heated to a temperature higher than the desired reaction temperature so that a portion of its heat may be imparted to the hydrocarbon feed introduced at a lower temperature.

The hot carrier plus catalyst then flows into reactor 4, either concurrently with hydrocarbon reactant introduced at 5 and leaving via 6, or countercurrent to the hydrocarbon introduced at 6 and leaving via 5. The carbonized carrier is removed via 7. Steam and air for partial combustion of the carrier in order to effect dehydration are introduced via 8 through preheater 9. The converted hydrocarbon vapors go to fractionating means not shown.

The conversion reactions which may be carried out include gas oil or naphtha cracking or reforming, dehydrogenation of butane or butene, as well as other reactions including polymerization and the like.

Example

Metallurgical coke, sized to 8–14 mesh, flows to a tumbling drum where it is sprayed with a 10% water slurry of alumina in suspension. The carrier flows to the drum at the rate of about 5 tons per hour. The suspension is pumped at pressure of about 300 p. s. i. through spray nozzles located in the top of the revolving drum. The drum rotates at a speed of about 30 R. P. M. so that the suspension is sprayed onto the carrier at the rate of about 60 gallons per hour. The carrier plus adsorbed catalyst flows to the dehydrator wherein it passes countercurrent to a stream of preheated steam and air. The air-steam ratio is controlled so as to maintain temperatures in the dehydration zone between about 900–1400° F. Heat is supplied by partial combustion of the carrier. The slurry deposited on the support is thus dehydrated and activated and the catalyst leaves the dehydrating zone at a temperature somewhat above that of the hydrocarbon to be converted so that some of the heat of reaction will be supplied thereby. The hot, dry-preheated catalyst then flows into the reactor where it is contacted with a stream of virgin gas oil preheated to about 500–1100° F., flowing concurrently therewith. The oil is cracked at an average temperature of 950–1050° F. and pressure of about 75 p. s. i. gauge. The oil vapors and catalyst flow through the reactor and the cracked vapors are drawn off at the bottom, from which they flow to a fractionation system. A yield of about 45% of gasoline is obtained having an unleaded A. S. T. M. octane rating of about 78. The spent catalyst is also drawn off at the bottom and may be recirculated to the activation treatment or burned as fuel after one or more cycles.

I claim:

1. In a process for the catalytic conversion of hydrocarbons wherein said hydrocarbons are contacted under conversion conditions with a catalyst carrying catalytically active material deposited on a combustible material support therefor, the improvement which comprises continuing said conversion until said catalyst is substantially deactivated by deposition of carbonaceous material thereon, removing the deactivated catalyst from the conversion zone, depositing additional active catalyst on said deactivated material from an aqueous solution, burning at least a portion of said support to dehydrate said activated catalyst, and again utilizing said catalyst with redeposited active material thereon for said catalytic conversion.

2. A process for the catalytic conversion of hydrocarbons which comprises impregnating a combustible carrier with active catalytic material in an aqueous medium, drying said impregnated material by partial combustion of the carrier with oxygen and steam, simultaneously preheating the catalyst by said combustion to a temperature at least as high as the desired conversion temperature and contacting the thus preheated catalyst with hydrocarbons to be converted at conversion conditions.

3. A process according to claim 2 wherein the combustible carrier is coke.

4. A process according to claim 2 wherein the combustible carrier is charcoal.

5. A process according to claim 2 wherein the combustible carrier is sawdust.

6. A process for the catalytic conversion of hydrocarbons which comprises flowing a solid combustible carrier into an activation zone wherein it is impregnated with an aqueous medium containing therein an active catalytic material, flowing the thus impregnated material into a dehydration zone, dehydrating said impregnated catalyst by partial combustion of said carrier at a temperature above 700° F., flowing the dehydrated material into a conversion zone in contact with hydrocarbons under conditions whereby said hydrocarbons are catalytically converted, separately recovering hydrocarbon products and said catalyst, and returning said recovered catalyst to said activation zone.

7. A process for catalytically cracking a hydrocarbon gas oil which comprises pre-heating said gas oil to a temperature between 500° F. and 1100° F., contacting in a reaction zone said preheated gas oil with a catalytic material comprising coke impregnated with an aqueous slurry of alumina and dried at 900° to 1400° F. by partial combustion of said coke in the presence of a heated mixture of steam and air, separately recovering the resulting cracked hydrocarbon products and said catalytic material, passing said catalyst to an activation zone wherein the catalyst is re-impregnated with alumina and dried as described above, returning said catalyst to said reaction zone and cracking additional oil.

EUGENE V. MATHY.

REFERENCES CITED

The following references are of record in the file of this patent:

UNITED STATES PATENTS

| Number | Name | Date |
| --- | --- | --- |
| 1,251,201 | Ellis | Dec. 25, 1917 |
| 1,703,528 | Herthel et al. | Feb. 26, 1929 |
| 2,348,699 | Tuttle | May 9, 1944 |
| 2,353,119 | Workman | July 4, 1944 |
| 2,428,715 | Marisic | Oct. 7, 1947 |